United States Patent [19]

Hall

[11] Patent Number: 5,344,866

[45] Date of Patent: Sep. 6, 1994

[54] FIRE RESISTANT COMPOSITES

[75] Inventor: Walter L. Hall, Mt. Vernon, Ind.

[73] Assignee: General Electric Company, Pittsfield, Mass.

[21] Appl. No.: 66,354

[22] Filed: May 21, 1993

[51] Int. Cl.⁵ .............................................. C08K 3/34
[52] U.S. Cl. .................................... 524/450; 524/494
[58] Field of Search ................... 524/450, 386, 494; 252/378 P, 378 R

[56] References Cited

U.S. PATENT DOCUMENTS

| | | | |
|---|---|---|---|
| 3,455,850 | 7/1969 | Saunders | 252/378 R |
| 3,716,449 | 2/1973 | Gatward et al. | |
| 3,916,057 | 10/1975 | Hatch et al. | 524/450 |
| 4,056,501 | 11/1977 | Gibbs et al. | |
| 4,305,992 | 12/1981 | Langer et al. | 524/450 |
| 4,323,531 | 4/1982 | Bradley et al. | |
| 4,426,470 | 1/1984 | Wessling et al. | |
| 4,795,776 | 1/1989 | Milner | 524/386 |
| 5,079,280 | 1/1982 | Yang et al. | 524/450 |

FOREIGN PATENT DOCUMENTS

| | | |
|---|---|---|
| 0125815 | 11/1984 | European Pat. Off. |
| 0148760 | 7/1985 | European Pat. Off. |
| 0148761 | 7/1985 | European Pat. Off. |
| 0282212 | 9/1988 | European Pat. Off. |

*Primary Examiner*—Veronica P. Hoke

[57] ABSTRACT

Reinforced polymer composites having a thermoplastic matrix material, reinforcing glass fibers, and a heat-expandable material selected from a group consisting of unexpanded vermiculite and unexpanded perlite are provided exhibiting improved fire resistant properties. The composites are prepared by performing a dilute aqueous slurry of a solid heat-fusible organic polymer, glass reinforcing fibers, and a heat-expandable material selected from the group consisting of vermiculite and perlite, agitating the slurry and then dewatering the slurry to provide a mat of thermoplastic polymer particles, reinforcing glass fiber, and a heat-expandable material. The mat is dried and then stamped under pressure and heat to consolidate the thermoplastic material to form a sheet-like composite structure. The composites exhibit reduced levels of early smoke generation and/or early heat generation.

10 Claims, No Drawings

FIRE RESISTANT COMPOSITES

BACKGROUND OF THE INVENTION

1. Field of the Invention

The present invention relates to flame resistant fiber reinforced thermoplastic composites, and more particularly relates to flame resistant thermoplastic composites having reinforcing glass fibers and a heat-expandable material.

2. Description of the Related Art

Thermoplastic composites having reinforcing materials and aqueous methods for making such fiber reinforced composite materials from an aqueous slurry of solid polymer and reinforcing material are known, see Published European Patent Applications 0,148,760 and 0,148,761, Wessling et al., U.S. Pat. No. 4,426,470 issued Jan. 17, 1984, and Gatward et al., U.S. Pat. No. 3,716,449 issued Feb. 13, 1973, all of which are incorporated herein by reference. In general these reinforced polymer composites have a uniform mixture of fiber, polymer and optionally binder and are prepared by performing dilute aqueous slurries of a solid heat-fusible organic polymer, a reinforcing material and optionally a latex binder.

Reinforcing materials disclosed have included organic and inorganic products such as graphite, metal fibers, aromatic polyamides, cellulose and polyolefin fibers, and typically have included glass fibers such as chopped glass strands having a length of ⅛ to 1 inch (about 3.2 to 25.4 mm) or milled glass fibers which generally have a length of about 1/32 to ⅛ inch (about 0.79 to 3.2 mm). While these composites which are prepared by the above described method exhibit levels of flame resistance as measured by OSU performance tests for heat release and smoke release, there is a continuing desire to improve the flame resistance performance of such composites.

SUMMARY OF THE INVENTION

This invention provides flame resistant thermoplastic composites comprising a thermoplastic matrix material, reinforcing glass fibers, and a heat-expandable material, wherein the composites are prepared by a process comprising forming a dilute aqueous slurry of a solid, water-insoluble heat-fusible organic polymer in particulate form, reinforcing glass fibers, and a heat-expandable material selected from the group consisting of perlite particulates and vermiculite particulates. The thermoplastic matrix material is a heat-fusible organic polymer, and is present at a level sufficient to act as a thermoplastic matrix in the composite and not merely as a binder material. The flame resistant thermoplastic composites exhibit reduced levels of heat release and smoke release as measured by OSU performance tests.

DETAILED DESCRIPTION OF THE INVENTION

The fire resistant thermoplastic composites of this invention have (a) a thermoplastic matrix material present at a level of from 40 to 75% by weight based on the total weight of the composite, more preferably from 40 to 60% by weight thereof, and most preferably from 45 to 55% by weight thereof; (b) reinforcing glass fibers preferably having lengths of between 0.10 inch and 1.0 inch wherein the fibers are present at a level of from 20 to 50% by weight based on the total weight of the composite, more preferably from 35 to 45% by weight thereof, and most preferably from 35 to 40% by weight thereof; and (c) a heat-expandable material selected from the group consisting of perlite particulates and vermiculite particulates wherein the heat-expandable material is present at a level of from 5 to 30% by weight based on the total weight of the composite, more preferably from 5 to 15% by weight thereof, and most preferably from 10 to 15% by weight thereof. Preferably the thermoplastic matrix material is present at a level in excess that of the glass reinforcing fibers, and preferably the glass reinforcing fibers are present at a level of at least twice that of the heat expandable material, for example any ratio of glass fiber to heat expandable material of from between 45:5 to 35:15, more preferably from 40:10 to 35:15. Preferably the composites are made by a process involving (1) an aqueous medium which preferably contains a binder, (2) a heat-fusible organic polymer which is in particulate form, (3) reinforcing glass fibers, and optionally (4) a flocculent.

In the process, a dilute aqueous slurry is prepared containing the heat-fusible organic polymer particulates and the reinforcing fibers. The slurry is agitated and then uniformly distributed onto a porous support and is allowed to drain to form a wet mat, the wet mat is optionally passed through press rolls and then dried, such as passing the wet mat through a series of heated dryer rolls to obtain a dried mat which optionally is rolled onto a cylinder or collected as a flat sheet stock. The dried mat may then be subjected to various kinds of treatment for the intended use such as compression molding the dried mat into articles. Optionally, a binder material is employed in the dilute aqueous slurry and the solids are flocculated during agitation with a polymeric flocculent having an opposite charge to that of the latex binder. Suitable binders and flocculents are set forth in Wessling et al., U.S. Pat. No. 4,426,470 issued Jan. 17, 1984 which is incorporated herein by reference. Suitable latexes which can be used in the present invention include those described in U.S. Pat. No. 4,056,501, issued Nov. 1, 1977, to Gibbs et al., incorporated herein by reference.

The invention requires a normally solid, heat fusible organic polymer. By "heat fusible" is meant that the polymer particles are capable of deformation under heat to join into an unitary structure. The heat fusible polymers may be either thermoplastic or thermoset resins. The heat fusible organic polymer component of the present invention is desirably a hydrophobic, water-insoluble addition polymer. These polymers are in particulate form and may be in the form of a powder or a dispersion. Suitable heat fusible organic polymers include addition and condensation polymers such as, for example, polyethylene; ultra high molecular weight polyethylene; chlorinated polyethylene; polycarbonates; bipolymers of ethylene and acrylic acid; polypropylene; nylons; phenylene oxide resins; phenylene sulfide resins; polyoxymethylenes; polyesters; terpolymers of acrylonitrile, butadiene and styrene; polyvinylchloride; bipolymers of a major proportion of vinylidene chloride and a minor proportion of at least one other alpha,beta-ethylenically unsaturated monomer copolymerizable therewith; and styrene homopolymers or copolymers. The polymer particulates generally and advantageously have a particle size in the range of 1 to 400 microns. The polymers are generally employed in an amount of from about 20 to 80 percent by weight of the solids, dry weight basis. A particularly preferred organic polymer is a polyolefin powder when such polymer has been prepared by the process of U.S. Pat. No. 4,323,531. Of course, blends of polymers may be used.

The reinforcement fibers include glass fibers preferably and advantageously comprises glass fibers such as chopped glass strands having a length of ⅛ to 1 inch (about 3.2 to 25.4 mm), milled glass fibers which generally have a length of about 1/32 to ⅛ inch (about 0.79 to 3.2 mm) and mixtures thereof. The glass fibers are advantageously heat cleaned and, to improve impact properties, such fibers may be compatibilized by having a thin coating of, for example a polyolefin resin or starch thereon. The reinforcing glass fibers generally comprise from about 20 to about 50 weight percent of the composite.

The process for making the final composite formed article involves first forming a mat as defined above, followed by heating the mat to a temperature sufficient to melt the thermoplastic material and stamping the consolidated sheet into a final article.

The composites of the invention may also, optionally, contain a variety of other ingredients. Minor amounts, for example, 10–33% by weight, of fillers such as silicon dioxide (Novacite), $CaCO_3$, MgO, $CaSiO_3$ (wollastonite) and mica may be incorporated in the composites of this invention if desired. Pigments or dyes may be added to impart opacity and/or color. Various chemical additives such as antioxidants, UV stabilizers, thickeners, foaming agents, anti-foaming agents, bactericides, electromagnetic radiation absorption agents, etc., may also be used.

The composites are formed by blending the heat-fusible polymer particulates, the reinforcing material, heat-expandable material, and the water, agitating to form a slurry, dewatering to form a continuous mat, drying, and applying heat and pressure to the mat to melt the thermoplastic resin and form the sheet-like composite structure which can then be stamped to form the final article.

This method is conveniently and preferably carried out by first stirring the reinforcing material in water until it is uniformly disbursed, then slowly adding the heat-fusible polymer, and stirring the materials throughout this portion of the process. This slurry of water, heat-fusible polymer, reinforcing material and optionally latex binder and flocculent preferably has a total solids content of 0.01 to 5% solids by weight, and more preferably 0.02 to 0.5% solids by weight based on the total weight of the slurry.

The sheet-forming and dewatering process may be accomplished by any conventional paper making apparatus such as a sheet mold or a Fourdinier or cylinder machines.

After the mat is formed into a dewatered sheet, it may be desirable to densify the sheet by pressing it with a flat press or by sending it through calendering rolls. Densification after drying of the mat is particularly useful for increasing the tensile and tear strength of the mat. Drying of the mat may be either air drying at ambient temperatures or oven drying.

The heat expandable material is selected from either unexpanded perlite or unexpanded vermiculite. It is important that the unexpanded forms of either the perlite or vermiculite be employed so that the thickness of the thermoplastic composite is at a minimum during actual use of the final composite article, but which will exhibit a tendency to expand upon contact with a flame sufficient to heat the heat expandable material to its expansion temperature.

The term vermiculite, used herein, refers to the group of rock forming mineral species characterized by a layer of lattice structure in which the silicate layer units have a thickness of approximately 10 Angstroms. The main elements present in the layer are magnesium, aluminum, silicon and oxygen with the layers being separated by one or two sheets of water molecules associated with cations such as magnesium, calcium, sodium and hydrogen. The layers have considerable lateral extent relative to the thickness of the basic 10 Angstrom unit layer. The term vermiculite, as used herein, therefore, includes minerals consisting wholly or largely of vermiculite or minerals of mixed layer type containing vermiculite layers as important constituents such as hydrobiotites, chlorite vermiculites, but does not include minerals of the montmorillonite group. Suitable vermiculite includes vermiculite which may be obtained from W. R. Grace & Company sold under the trademark VCX. Typically unexpanded vermiculite has a bulk density of from 50 to 60 lbs. per ft.$^3$ (pounds per cubis foot) or 801 to 961 kgs per m$^3$, and upon expansion has a bulk density of from 4 to 10 lbs. per ft$^3$ (64.1 to 160.2 kgs per m$^3$). Also useful as mentioned above is perlite which is a eutectic between ferrite cementite. Typically in flame resistant thermoplastic composites, one might want to employ high temperature engineering thermoplastics or thermosets, or employ high levels of halogenated flame retardants in order to resist burning of the thermoplastic matrix material. The thermoplastic composites of the present invention, however, preferably employ thermoplastics which have a relatively low glass transition temperature and/or heat distortion temperature and/or Vicat softening point. Heat distortion temperature may be measured by American Standard Method (ASTM) D648-56. Preferably the heat distortion temperature of the thermoplastic matrix material is below 200° C. as measured by ASTM D648, more preferably below 170° C., and most preferably below 150° C. The advantage of employing a thermoplastic matrix material which softens and/or melts at a relatively low temperature, is that the material once it sufficiently softens permits expansion of the thermoplastic composite by permitting expansion of the heat expandable material and by permitting the built in stresses of the reinforcing fibers to release thereby causing lofting of the reinforcing glass fibers. These composites upon exposure to intense heat and/or flame exhibit substantial degree of expansion and lofting which thereby provides an effective heat and flame barrier to provide some degree of protection to structures behind the thermoplastic composite article.

The preferred thermoplastic materials are selected from the group consisting of polypropylene, aromatic polycarbonates, and polybutylene terephthlate. Most preferably the thermoplastic material is polypropylene. The combination of vermiculite and glass fibers will most likely provide an improved barrier to heat penetration upon expansion of the vermiculite.

EXAMPLES

The following examples illustrate the present invention, but are not meant to limit the scope thereof.

TABLE I

Polypropylene Composites

| Ex No. | Glass (%) | Additive (%) | Thickness (In.) | Specific Gravity | OSU Heat 2 Min. | OSU Heat Peak | OSU Smoke 2 Min. | OSU Smoke Peak | NBS Smoke $D_{1.5}$ | NBS Smoke $D_{4.0}$ | NBS Smoke Max |
| --- | --- | --- | --- | --- | --- | --- | --- | --- | --- | --- | --- |
| A | 50 | 0 | 0.164 | 0.94 | 131 | 93 | 73 | 57 | 0.5 | 1.0 | 1.2 |
| B | 0 | LTEV(50) | 0.105 | 1.3 | 240 | 336 | 179 | 243 | 3.7 | 16 | 16 |
| 1. | 35 | LTEV(15) | 0.114 | 1.2 | 128 | 117 | 64 | 61 | 0.5 | 1.1 | 2.2 |
| 2. | 35 | VCX(15) | 0.119 | 1.2 | 117 | 100 | 51 | 41 | 0.3 | 0.6 | 1.1 |
| 3. | 20 | LTEV(30) | 0.112 | 1.2 | 125 | 106 | 70 | 55 | 0.6 | 1.0 | 1.3 |
| 4. | 30 | LTEV(20) | 0.103 | 1.2 | 121 | 117 | 62 | 44 | 0.5 | 1.0 | 1.2 |
| 5. | 40 | LTEV(10) | 0.138 | 1.1 | 118 | 101 | 55 | 41 | 0.6 | 1.3 | 1.4 |
| C | 50 | 0 | 0.235 | 0.69 | 129 | 96 | 57 | 44 | 0.7 | 1.2 | 2.1 |
| 6. | 35 | LTEV(15) | 0.225 | 0.61 | 133 | 101 | 55 | 52 | 0.5 | 1.6 | 2.8 |

TABLE II

Lexan Composites

| Ex No. | Glass (%) | Additive (%) | Thickness (In.) | Specific Gravity | OSU Heat 2 Min. | OSU Heat Peak | OSU Smoke 2 Min. | OSU Smoke Peak | NBS Smoke $D_{1.5}$ | NBS Smoke $D_{4.0}$ | NBS Smoke Max |
| --- | --- | --- | --- | --- | --- | --- | --- | --- | --- | --- | --- |
| D | 50 | 0 | 0.125 | 1.2 | 66 | 57 | 88 | 69 | 5.4 | 28 | 53 |
| 7. | 45 | LTEV(5) | 0.125 | 1.3 | 59 | 51 | 44 | 36 | 6.3 | 33 | 52 |
| 8. | 40 | LTEV(10) | 0.118 | 1.3 | 59 | 51 | 42 | 34 | 6.6 | 50 | 7.6 |
| 9. | 35 | LTEV(15) | 0.125 | 1.2 | 55 | 53 | 23 | 29 | 11 | 57 | 81 |
| 10. | 35 | VCX(15) | 0.118 | 1.3 | 58 | 54 | 47 | 39 | 10 | 56 | 80 |
| E | 50 | 0 | 0.243 | 0.64 | 67 | 57 | 71 | 71 | 5.5 | 42 | 66 |
| 11. | 45 | LTEV(5) | 0.240 | 0.65 | 61 | 51 | 38 | 39 | 7.5 | 69 | 101 |
| 12. | 40 | LTEV(10) | 0.235 | 0.64 | 58 | 54 | 25 | 36 | 10 | 82 | 122 |
| 13. | 35 | LTEV(15) | 0.235 | 0.66 | 52 | 50 | 23 | 30 | 16 | 87 | 119 |
| 14. | 35 | VCX(15) | 0.238 | 0.65 | 59 | 51 | 25 | 32 | 11 | 75 | 103 |

TABLE III

Polybutyleneterephthalate

| Ex No. | Glass (%) | Additive (%) | Thickness (In.) | Specific Gravity | OSU Heat 2 Min. | OSU Heat Peak | OSU Smoke 2 Min. | OSU Smoke Peak | NBS Smoke $D_{1.5}$ | NBS Smoke $D_{4.0}$ | NBS Smoke Max |
| --- | --- | --- | --- | --- | --- | --- | --- | --- | --- | --- | --- |
| F | 50 | 0 | 0.122 | 1.3 | 102 | 87 | 105 | 88 | 6.9 | 12 | 25 |
| 15. | 45 | LTEV(5) | 0.135 | 1.2 | 89 | 72 | 63 | 50 | 1.7 | 16 | 35 |
| 16. | 40 | LTEV(10) | 0.127 | 1.2 | 85 | 70 | 48 | 37 | 1.6 | 20 | 39 |
| 17. | 35 | LTEV(15) | 0.120 | 1.3 | 86 | 73 | 45 | 35 | 2.3 | 20 | 49 |
| 18. | 35 | VCX(15) | 0.122 | 1.3 | 82 | 72 | 54 | 55 | 2.2 | 15 | 37 |
| G | 50 | 0 | 0.236 | 0.67 | 111 | 81 | 112 | 110 | 12 | 24 | 43 |
| 19. | 45 | LTEV(5) | 0.234 | 0.68 | 97 | 68 | 71 | 79 | 3.6 | 31 | 48 |
| 20. | 40 | LTEV(10) | 0.225 | 0.69 | 93 | 66 | 59 | 75 | 3.0 | 38 | 63 |
| 21. | 35 | LTEV(15) | 0.231 | 0.67 | 92 | 64 | 52 | 63 | 3.7 | 51 | 83 |
| 22. | 35 | VCX(15) | 0.230 | 0.68 | 85 | 64 | 45 | 58 | 3.4 | 46 | 72 |

Table I illustrates the improved properties obtained by the thermoplastic compositions of the present invention wherein polypropylene is employed as the thermoplastic matrix material. Examples A, B and C are comparative examples. Examples 1 to 6 are examples illustrating the present invention and contain respective amounts of reinforcing glass fiber and heat expandable material (vermiculite). OSU means Ohio State University performance tests and NBS means National Bureau of Standards smoke test.

LTEV means a non-expanded low temperature expandable vermiculite material. VCX means a non-expanded vermiculite material.

Table II contains thermoplastic composites which employ an aromatic polycarbonate derived from bisphenol-A and phosgene. Examples D and E are comparative examples, and examples 7 through 14 illustrate thermoplastic composites of the present invention which comprise both a heat-expandable material and glass reinforcing fibers.

Table III contains examples employing polybutyleneterephthalate resin as the thermoplastic matrix material in the composites. Examples F and G are comparative examples, and examples 15 through 22 are examples illustrating the present invention comprising both glass reinforcing fibers and unexpanded vermiculite.

Note that the compositions of the present invention exhibit reduced levels of heat as measured by OSU tests for 2 minute heat and peak heat generation and also the improved smoke properties of the composites as demonstrated by OSU smoke tests for 2 minute smoke and peak smoke. Note also similar results for the NBS early smoke formation. The composites of the present invention provide reduced levels of heat generation both at 2 minutes level and at peak level and reduced smoke generation. Note that the property improvements are obtained over either glass alone or vermiculite alone.

The glass fibers of Tables 1, 2 and 3 had a length of ½ inch and a diameter of 16 micrometers.

What is claimed is:

1. A flame resistant thermoplastic composite, consisting essentially of:

a) a thermoplastic matrix material present at a level of from 40 to 75% by weight based on the total weight of the composite;
b) reinforcing glass fibers having lengths of between 0.10 inch and 1.0 inch, said fibers being present at a level of from 20 to 50% by weight based on the total weight of said composite, and
c) a heat-expandable material selected from the group consisting of perlite particulates and vermiculite particulates, said heat-expandable material being present at a level of from 5 to 30% by weight based on the total weight of the composite.

2. The composite of claim 1 wherein said thermoplastic matrix material has a heat distortion temperature of less than 170° C.

3. The composite of claim 1 wherein said thermoplastic resin is selected from the group consisting of aromatic polycarbonate resins, polypropylene resins and polybutyleneterephthalate resins.

4. The composite of claim 1 wherein said heat-expandable material is present at a level of from 5 to 10% by weight based on the total weight of the composite.

5. The composite of claim 1 wherein said resin is polypropylene.

6. The composite of claim 5 wherein said heat expandable material consist essentially of vermiculite.

7. A flame resistant thermoplastic composite, comprising:
a) a polypropylene resin thermoplastic matrix material having a heat distortion transition temperature of less than 150 degrees Centigrade present at a level of from 40 to 75 percent by weight based on the total weight of the composite;
b) reinforcing glass fibers having lengths of between 0.10 inch and 1.0 inch, said fibers being present at a level of from 20 to 50 percent by weight based on the total weight of said composite, and
c) a heat-expandable material selected from the group consisting of perlite particulates and vermiculite particulates, said heat-expandable material being present at a level of from 5 to to 10 percent by weight based on the total weight of the composite.

8. The composite of claim 7 wherein said heat expandable material consist essentially of vermiculite.

9. The composite of claim 8 wherein said vermiculite has an unexpanded bulk density of from 50 to 60 lbs. per cubic foot and an expanded bulk density of from 4 to 10 pounds per cubic foot.

10. The composite of claim 8 wherein said vermiculite has an unexpanded bulk density of from 50 to 60 lbs. per cubic foot and an expanded bulk density of from 4 to 10 pounds per cubic foot.

* * * * *